United States Patent Office 3,396,277
Patented Aug. 6, 1968

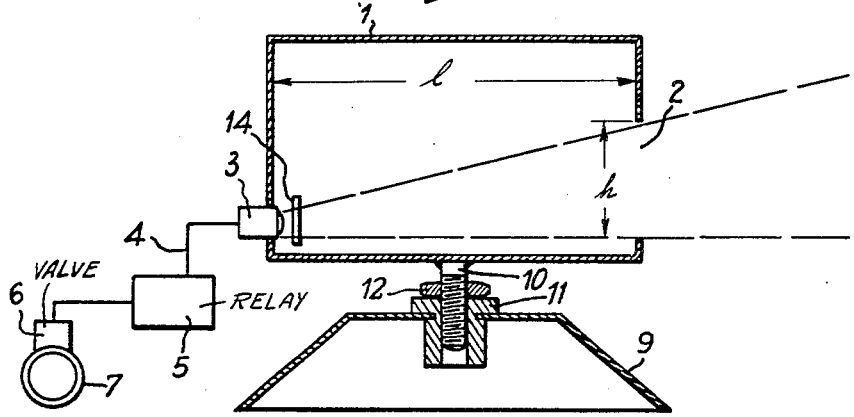
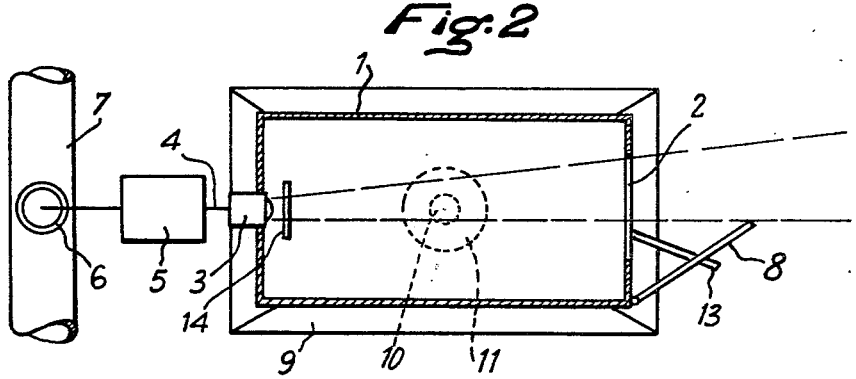
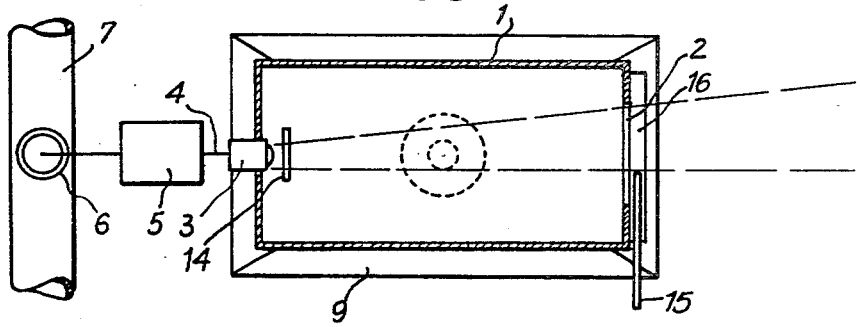

3,396,277
RADIATION SENSITIVE IRRIGATION DEVICE
Charles Ayme de la Chevreliere, 21 Ave. de Madrid,
Neuilly-sur-Seine, France
Filed Sept. 30, 1964, Ser. No. 400,380
Claims priority, application France, Oct. 22, 1963,
951,330
7 Claims. (Cl. 250—215)

This invention relates to automatic water sprinking or irrigation devices.

The success of plant cultivation in plantations, gardens or the like, whether for pleasure or for profit, depends on regular watering in accordance with atmospheric conditions.

Regular irrigation requires a permanent staff, a matter which is often difficult to reconcile with the cost of labour in agricultural cultivations carried on for profit and, in the case of a pleasure garden the proprietor of the garden is often absent at the moment at which it becomes necessary to sprinkle or water, either by reason of his professional obligations or for other reasons, such as travelling, holidays or the like.

The present invention aims to permit the automatic sprinkling in accordance with the influence of the sun, the position of the sun determining the hour and duration of sprinkling and the intensity thereof (in accordance with cloud formation) determining the necessity for functioning.

According to the present invention an automatic sprinkling or irrigation device operable to switch on and off sprinklers or other irrigation devices at a predetermined time and for a predetermined duration detects sunlight at a predetermined hour of the day and for a predetermined time, the device, upon detecting sunlight, operates the sprinklers or the irrigation devices and on ceasing to detect sunlight switches them off.

Preferably:

(a) the detection means comprises a camera obscura having an aperture in the form of a vertical slot or hole the direction of which is determined in such manner relative to the cardinal points of a compass and at a desired elevation with respect to the earth and the line containing the midpoint of the slit or hole and the photo-electric cell as to fix the instant of functioning of the device and the width of which is determined in such manner as to determine the duration of functioning of the device;

(b) the height of the slot or hole is determined with respect to the length of the camera obscura, in order to eliminate any possibility of accidental functioning when the sun is excessively high on the horizon, in the case of unintentional displacement of the apparatus, thus modifying the orientation thereof;

(c) the responsive means consists of a photo-sensitive cell;

(d) the tripping means consist of a relay energising an electro-magnetic valve freeing the arrangement for feeding the water to the sprinkling or irrigation means.

By way of example and in order to facilitate understanding of the invention, in the accompanying drawings:

FIGURE 1 shows a sectional, profile view of an embodiment of the device according to the invention, FIGURE 2 shows a view, in plan and in section, of FIGURE 1, FIGURE 3 shows a variant of the device according to FIGURE 2.

Referring to FIGURES 1 and 2, it will be seen that the device consists of a rectangular camera obscura 1, having a slot 2 at one of its ends and a photo-sensitive cell 3 at the other and being connected by a conductor 4 to a relay 5 controlling an electro-magnetic valve 6 disposed in a feed conduit 7 feeding a sprinkling or irrigation device (not shown, since it may be of any known type).

A shutter 8 is articulated on one of the sides of the camera obscura 1. The camera obscura 1 bears on a base 9 through the intermediary of a pivot 10 mounted for rotation in a sleeve 11. The pivot 10 is screw threaded, as is also the sleeve 11, and a lock nut 12 permits the locking of the pivot 10.

The device functions in the following manner: the camera obscura 1 is orientated with respect to the compass and elevation with respect to the earth as hereinbelow described through the intermediary of the pivot 10, of the sleeve 11 and of the lock nut 12, in such manner as to determine the time at which the light of the sun will impinge on the photo-sensitive cell 3 disposed at the end of the camera obscura.

The shutter 8 is locked by a link 13 in an angular position which is so selected as to determine the interval of time during which the light of the sun will penetrate into the camera obscura during the apparent rotation of the sun.

As long as the photo-sensitive cell 3 is subjected to the action of the light of the sun, it feeds the relay 5 which maintains open the electro-magnetic valve 6 permitting the circulation of the water through the pipe system 7.

Preferably, the height $h$ of the slot 2 in the camera obscura 1 is determined relatively to its length $l$ in such manner that if the apparatus is disorientated for a reason of any kind, the light of the sun, when it is high up on the horizon, is not able to impinge on the cell 3; sprinkling must be effected only when the sun is low. Preferably, there is disposed before the cell 3 a filter 14 permitting the adjustment of the light intensity acting on the cell.

It is also possible, in place of disposing a filter 14, to adjust the relay 5 in such manner that it acts on the valve 6 only in the event of a predetermined intensity of the signal emitted by the cell 3.

Thus, with this device, it becomes possible to achieve automatic sprinkling as a function of the hour of the day, the said sprinkling taking place during a predetermined period of time and with an intensity of solar irradiation which is also predetermined, these various parameters being determinable at will.

FIGURE 3 shows a variant, wherein the shutter 8 is replaced by a shutter 15 sliding in two slideways 16 carried by the front wall of the camera obscura 1.

What I claim is:

1. An automatic irrigation arrangement comprising, in combination, valve means movable between an open position admitting water to an irrigation device and a closed position; actuating means connected to said valve means for moving the latter between said positions thereof; and control means connected to said actuating means for controlling the same and including radiation sensitive stationary means arranged and constructed to emit a signal and ray limiting means subjecting said radiation sensitive means to rays of the sun at a predetermined angle and a predetermined intensity to actuate said actuating means and to thereby move said valve means to one of said positions as long as said signal is emitted and to move said valve means to the other of said positions upon cessation of said signal.

2. An arrangement as defined in claim 1, wherein said ray limiting means includes a stationary housing of opaque material and provided in a wall thereof with an aperture, and said radiation sensitive means comprises a photoelectric cell in said housing arranged to receive sunlight through said aperture only when the sun is positioned a predetermined maximum distance above the horizon.

3. An arrangement as defined in claim 2 and including means cooperating with said aperture in said housing to vary the length of time during the day at which sunlight may impinge on said photo-electric cell.

4. An arrangement as defined in claim 2, and including filter means in said housing between said aperture and said photo-electric cell to adjust the intensity of the light impinging on said photo-electric cell.

5. An arrangement as defined in claim 2, wherein said valve means is an electromagnetic valve and wherein said actuating means includes a relay.

6. An arrangement as defined in claim 2, wherein said housing is an elongated housing and said photo-electric cell is arranged in said housing opposite and spaced from said one wall provided with said aperture in such a manner so as to receive sunlight only when the sun is near the horizon.

7. An arrangement as defined in claim 1, wherein said actuating means is constructed and cooperates with said valve means and said control means to move said valve means to said open position as long as said signal is emitted and to close said valve means upon cessation of said signal.

References Cited

UNITED STATES PATENTS

| | | | |
|---|---|---|---|
| 2,152,973 | 4/1939 | Rathwell | 88—14 |
| 2,524,796 | 10/1950 | Higgins | 239—67 X |
| 3,031,351 | 4/1962 | McIlvaine | 250—237 |
| 3,064,131 | 11/1962 | Brown | 250—203 |
| 3,224,676 | 12/1965 | Rauchwerger | 250—206 X |

WALTER STOLWEIN, *Primary Examiner.*